(12) United States Patent
Tsuji et al.

(10) Patent No.: US 11,837,121 B2
(45) Date of Patent: Dec. 5, 2023

(54) DISPLAY CORRECTION SYSTEM, DISPLAY SYSTEM, AND DISPLAY CORRECTION METHOD

(71) Applicant: PANASONIC INTELLECTUAL PROPERTY MANAGEMENT CO., LTD., Osaka (JP)

(72) Inventors: Masanaga Tsuji, Osaka (JP); Toshiya Mori, Osaka (JP); Fumihito Inukai, Kyoto (JP); Tadashi Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 88 days.

(21) Appl. No.: 17/699,800

(22) Filed: Mar. 21, 2022

(65) Prior Publication Data
US 2022/0319365 A1    Oct. 6, 2022

(30) Foreign Application Priority Data
Mar. 30, 2021    (JP) .............................. JP2021-056953

(51) Int. Cl.
G09G 3/00    (2006.01)
G06V 20/58    (2022.01)
B60K 35/00    (2006.01)

(52) U.S. Cl.
CPC ............. G09G 3/002 (2013.01); G06V 20/58 (2022.01); *B60K 35/00* (2013.01);
(Continued)

(58) Field of Classification Search
None
See application file for complete search history.

(56) References Cited

U.S. PATENT DOCUMENTS 9,459,113 B2 *  10/2016  Zhang ................... G01C 21/36
11,629,972 B2 *   4/2023  Kassner ............. G01C 21/3415
                                                                701/431
(Continued)

FOREIGN PATENT DOCUMENTS

JP    2015-101311    6/2015
WO    2020/209298   10/2020

*Primary Examiner* — Frank S Chen
(74) *Attorney, Agent, or Firm* — GREENBLUM & BERNSTEIN, P.L.C.

(57) ABSTRACT

A display correction system includes a first obtainer, a second obtainer, a third obtainer, a predictor, and a corrector. The first obtainer obtains travel route information on a travel route ahead of a moving body. The second obtainer obtains speed information on a speed of the moving body. The third obtainer obtains orientation information on an orientation of the moving body. The predictor predicts, based on the travel route information and the speed information, a time period during which the moving body travels through a specific section in the travel route. The corrector performs correction of a displacement of a display position of a content on a display image based on the orientation information. Based on prediction result of the predictor, the corrector executes first control when the moving body is traveling in a normal section, and executes second control when the moving body is traveling in the specific section.

7 Claims, 4 Drawing Sheets

(52) U.S. Cl.
CPC .. *B60K 2370/1529* (2019.05); *B60K 2370/23* (2019.05); *G09G 2340/0464* (2013.01); *G09G 2380/10* (2013.01)

(56) References Cited

U.S. PATENT DOCUMENTS

| | | | |
|---|---|---|---|
| 2016/0216521 A1 | 7/2016 | Yachida et al. | |
| 2019/0137294 A1* | 5/2019 | Jung | G01C 21/3867 |
| 2019/0258057 A1* | 8/2019 | Hada | G02B 27/0101 |
| 2020/0282832 A1* | 9/2020 | Watanabe | B60R 11/02 |
| 2022/0028307 A1 | 1/2022 | Matsui et al. | |

* cited by examiner

DISPLAY CORRECTION SYSTEM, DISPLAY SYSTEM, AND DISPLAY CORRECTION METHOD

CROSS REFERENCE TO RELATED APPLICATION

The present application is based on and claims priority of Japanese Patent Application No. 2021-056953 filed on Mar. 30, 2021.

FIELD

The present disclosure generally relates to display correction systems, display systems, and display correction methods that allow correcting a displacement of the display position of content in a display image displayed by a display system on a display medium.

BACKGROUND

Patent Literature 1 discloses a vehicle information projection system. This vehicle information projection system includes an information obtainer, a first display means, and a display controller. The information obtainer estimates the position of a specific object outside a vehicle equipped with the system. The first display means generates a superimposed image related to the specific object. The information obtainer detects behavior of the vehicle. The display controller, according to the position of the specific object estimated by information obtainer, adjusts the position at which the display image is projected, and based on the behavior of the vehicle, replaces the superimposed image with an alternative image that is a different display image.

CITATION LIST

Patent Literature

PTL 1: Japanese Unexamined Patent Application Publication No. 2015-101311

SUMMARY

The present disclosure provides a display correction system and other aspects can attein further improvement.

In accordance with an aspect of the present disclosure, a display correction system includes: a first obtainer that obtains travel route information on a travel route ahead of a moving body; a second obtainer that obtains speed information on a speed of the moving body; a third obtainer that obtains orientation information on an orientation of the moving body; a predictor that performs, based on the travel route information and the speed information, processing of determining a specific section in the travel route and predicting a time period during which the moving body travels through the specific section; and a corrector that performs correction of a displacement of a display position of a content on a display image based on the orientation information, the display image being displayed on a display medium by a display system, wherein the corrector performs the correction under first control, when determining, based on a result of the processing performed by the predictor, that the moving body is traveling in a normal section other than the specific section in the travel route, and the corrector performs the correction under second control different from the first control, when determining, based on a result of the processing performed by the predictor, the moving body is traveling in the specific section.

In accordance with another aspect of the present disclosure, a display system includes the above-described display correction system; a drawer that draws the display image; and a projector that projects the display image onto the display medium to be viewed as a virtual image by an occupant of the moving body, the display image being drawn by the drawer.

In accordance with still another aspect of the present disclosure, a display correction method includes: obtaining travel route information on a travel route ahead of a moving body; obtaining speed information on a speed of the moving body; obtaining orientation information on an orientation of the moving body; performing, based on the travel route information and the speed information, processing of (i) determining a specific section in the travel route and (ii) predicting a time period during which the moving body travels through the specific section; and correcting a displacement of a display position of a content on a display image based on the orientation information, the display image being displayed on a display medium by a display system, wherein the correcting is performed under first control, when determining, based on a result of the processing performed in the performing, that the moving body is traveling in a normal section other than the specific section in the travel route, and the correcting is performed under second control different from the first control, when determining, based on a result of the processing performed in the performing, the moving body is traveling in the specific section.

The display correction system and other aspects of the present disclosure can attain further improvement.

DESCRIPTION OF EMBODIMENT

In accordance with an aspect of the present disclosure, a display correction system includes: a first obtainer that obtains travel route information on a travel route ahead of a moving body; a second obtainer that obtains speed information on a speed of the moving body; a third obtainer that obtains orientation information on an orientation of the moving body; a predictor that performs, based on the travel route information and the speed information, processing of determining a specific section in the travel route and predicting a time period during which the moving body travels through the specific section; and a corrector that performs correction of a displacement of a display position of a content on a display image based on the orientation information, the display image being displayed on a display medium by a display system, wherein the corrector performs the correction under first control, when determining, based on a result of the processing performed by the predictor, that the moving body is traveling in a normal section other than the specific section in the travel route, and the corrector performs the correction under second control different from the first control, when determining, based on a result of the processing performed by the predictor, the moving body is traveling in the specific section.

According to the above aspect, the corrector performs control in the specific section that is different from control in the normal section, for example reducing the possibility of performing the correction (correction processing) in the specific section. This can advantageously improve the accuracy of correcting a displacement of the display position of the content in the display image. In addition, according to the above aspect, the predictor can proactively predict the specific section ahead of the moving body. This advantageously allows the second control to be started upon the arrival of the moving body at the specific section.

In the display correction system, it is possible that the second control is less sensitive to a change in the orientation information than the first control is.

According to the above aspect, the possibility of performing unnecessary correction in the specific section is reduced. This can advantageously facilitate improving the accuracy of correcting a displacement of the display position of the content in the display image.

In the display correction system, it is possible that the corrector performs the correction when a frequency of vibration of the moving body is higher than a predetermined frequency, and the predetermined frequency is set higher in the second control than in the first control.

According to the above aspect, the possibility of performing unnecessary correction in the specific section is reduced. This can advantageously facilitate improving the accuracy of correcting a displacement of the display position of the content in the display image. In addition, according to the above aspect, for some frequencies of vibration of the moving body, a displacement of the display position of the content due to a temporary change in the orientation of the moving body can be advantageously corrected even in the specific section.

In the display correction system, it is possible that the corrector stops the correction under the second control.

According to the above aspect, unnecessary correction is avoided in the specific section. This can advantageously facilitate improving the accuracy of correcting a displacement of the display position of the content in the display image.

In the display correction system, it is possible that the specific section is a section in which an inclination of the travel route changes.

According to the above aspect, the possibility of the occurrence of a displacement of the display position of the content in the display image is advantageously reduced if the moving body enters a section in which the inclination changes, such as a slope.

In accordance with another aspect of the present disclosure, a display system includes the above-described display correction system; a drawer that draws the display image; and a projector that projects the display image onto the display medium to be viewed as a virtual image by an occupant of the moving body, the display image being drawn by the drawer.

According to the above aspect, the occupant views the display image in which a displacement of the display position of the content has been corrected. This advantageously facilitates the occupant's recognition of the content.

In accordance with still another aspect of the present disclosure, a display correction method includes: obtaining travel route information on a travel route ahead of a moving body; obtaining speed information on a speed of the moving body; obtaining orientation information on an orientation of the moving body; performing, based on the travel route information and the speed information, processing of (i) determining a specific section in the travel route and (ii) predicting a time period during which the moving body travels through the specific section; and correcting a displacement of a display position of a content on a display image based on the orientation information, the display image being displayed on a display medium by a display system, wherein the correcting is performed under first control, when determining, based on a result of the processing performed in the performing, that the moving body is traveling in a normal section other than the specific section in the travel route, and the correcting is performed under second control different from the first control, when determining, based on a result of the processing performed in the performing, the moving body is traveling in the specific section.

According to the above aspect, the correcting step performs control in the specific section that is different from control in the normal section, for example reducing the possibility of performing the correction in the specific section. This can advantageously improve the accuracy of correcting a displacement of the display position of the content in the display image. In addition, according to the above aspect, the predicting step can proactively predict the specific section ahead of the moving body. This advantageously allows the second control to be started upon the arrival of the moving body at the specific section.

In accordance with still another aspect of the present disclosure, a program causes one or more processors to perform the above-described display correction method.

According to the above aspect, the correcting step performs control in the specific section that is different from control in the normal section, for example reducing the possibility of performing the correction in the specific section. This can advantageously improve the accuracy of correcting a displacement of the display position of the content in the display image. In addition, according to the above aspect, the predicting step can proactively predict the specific section ahead of the moving body. This advantageously allows the second control to be started upon the arrival of the moving body at the specific section.

General or specific aspects of the present disclosure may be implemented to a system, a device, a method, an integrated circuit, a computer program, a computer-readable recording medium such as a Compact Disc-Read Only Memory (CD-ROM), or any given combination thereof.

Hereinafter, Embodiments will be described in detail with reference to the accompanying Drawings. The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

It should be noted that the respective figures are schematic diagrams and are not necessarily precise illustrations. Additionally, components that are essentially the same share like reference signs in the figures.

Embodiment

Configuration

Figure 1:
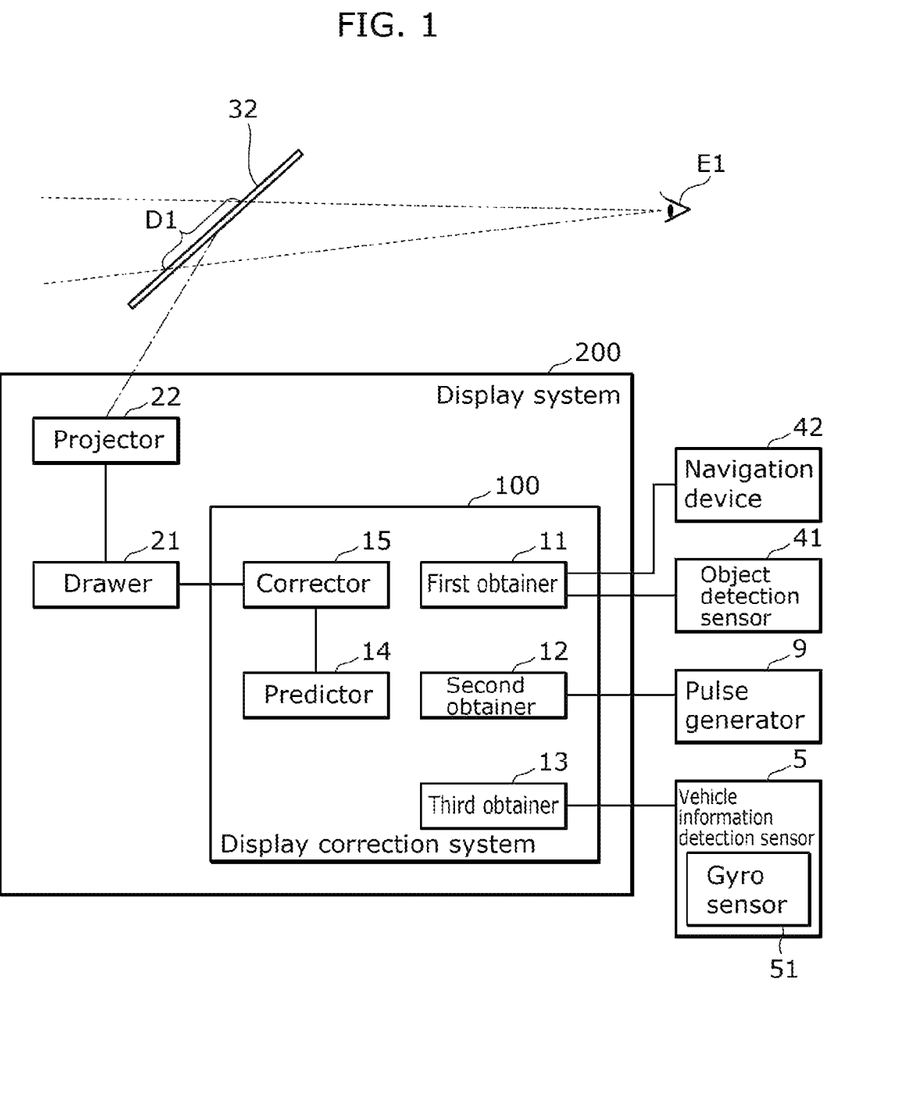
FIG. 1 is a block diagram illustrating an overview of a display system having a display correction system in an embodiment.
Figure 2:
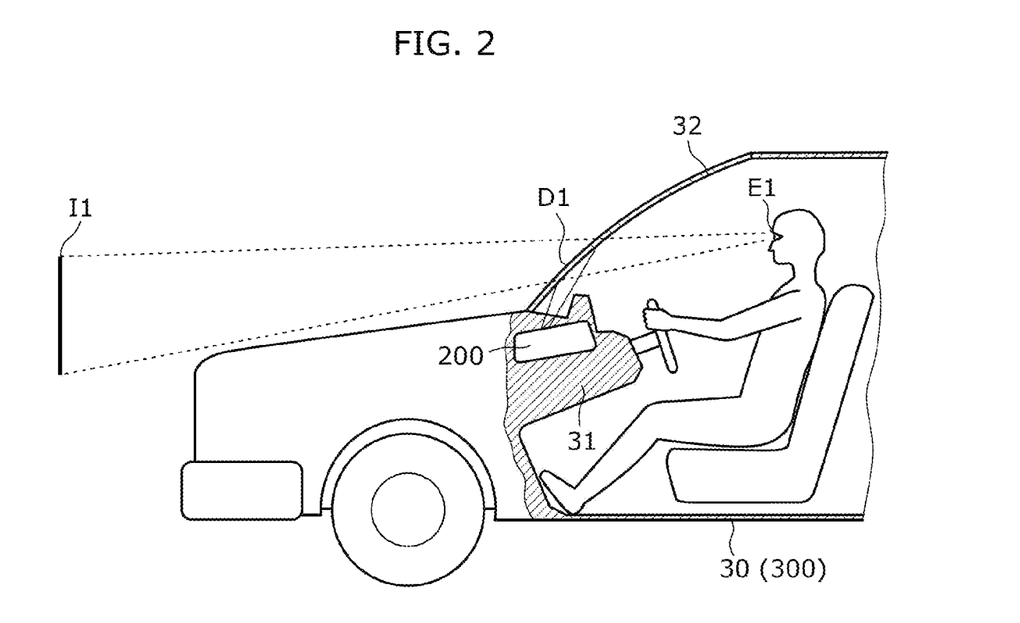
FIG. 2 is a diagram illustrating an exemplary use of the display system in the embodiment.

FIG. 1 is a block diagram illustrating an overview of display system 200 having display correction system 100 in an embodiment. FIG. 2 is a diagram illustrating an exemplary use of display system 200 in the embodiment. Display system 200 in the embodiment is, for example, a head-up display (HUD) system that is installed in moving body 300 such as vehicle 30 and that projects an image (display image 8) representing information into predetermined area D1 on a display medium such as windshield 32 to allow an occupant having viewpoint E1 to view a virtual image showing the information.

In the example illustrated in FIG. 2, display system 200 is provided in dashboard 31 of vehicle 30. In the visual field of the occupant having viewpoint E1, a virtual image is viewed as being displayed on virtual HUD display surface I1 and located ahead of vehicle 30. This display system allows information to appear as a virtual image superimposed on a real view in the occupant's visual field.

Although the embodiment will describe vehicle 30 as an example of moving body 300 to which display system 200 is applied, moving body 300 is not limited to vehicle 30 but may be a watercraft or an aircraft, for example. If moving body 300 is a watercraft, travel route A1 (see FIG. 4) to be described below is a sea route. If moving body 300 is an aircraft, travel route A1 is an air route. Although the embodiment will specifically describe a driver of vehicle 30 as an example of the occupant of moving body 300, the occupant is not limited to a driver.

Figure 3:
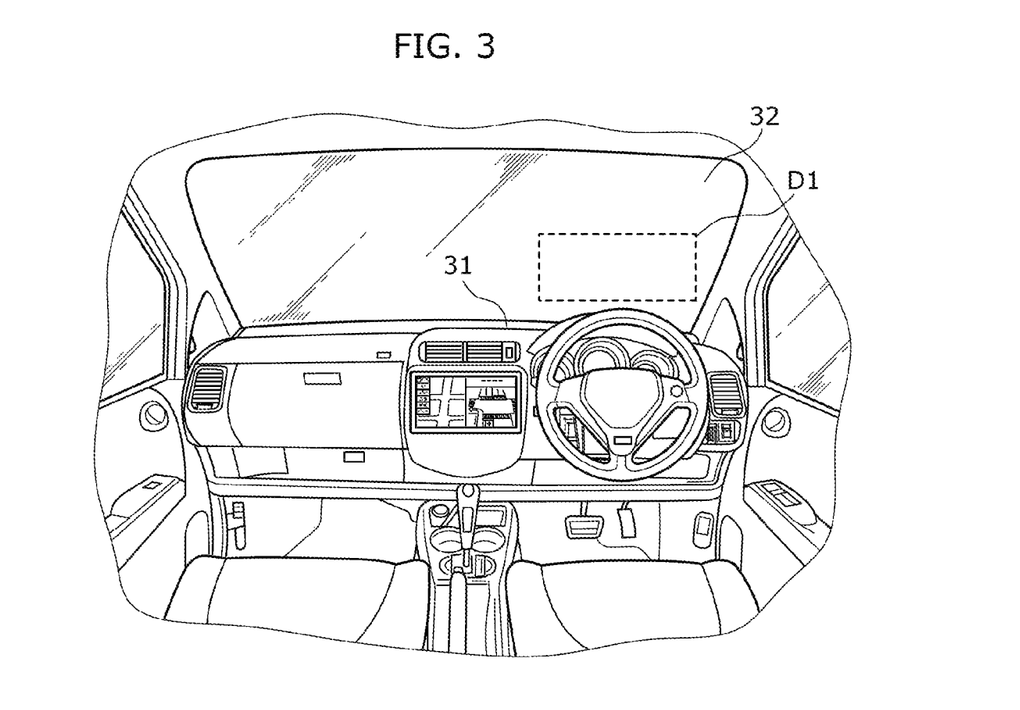
FIG. 3 is a diagram illustrating an example of a predetermined area into which an image displayed by the display system is projected in the embodiment.

The display range of the virtual image displayed in the occupant's visual field by image projection in display system 200 (i.e., the maximum range capable of displaying the virtual image of the maximum size) is limited to a certain area that depends on, for example, the placement or structure of display system 200. FIG. 3 is a diagram illustrating an example of predetermined area D1 into which the image displayed by display system 200 is projected in the embodiment. In other words, FIG. 3 is a diagram, viewed from the inside of vehicle 30, illustrating an example of the range of predetermined area D1 on windshield 32 (the display medium) into which the image displayed by display system 200 is projected. As illustrated in FIG. 3, predetermined area D1 corresponds to a certain angle of view (a certain viewing angle) in the visual field of the occupant (here, the driver) looking ahead of vehicle 30.

As illustrated in FIG. 1, display system 200 includes display correction system 100, drawer 21, and projector 22.

Figure 5:
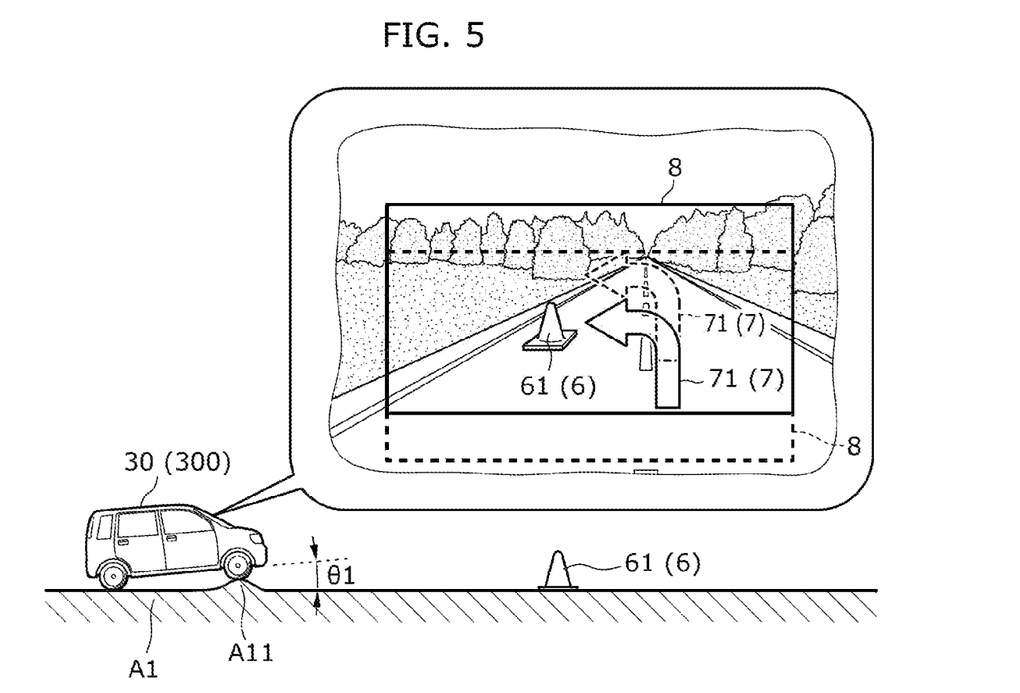
FIG. 5 is a diagram for describing operations of a corrector in the display correction system in the embodiment.

Drawer 21 draws display image 8 that is projected onto windshield 32 (the display medium) to be viewed as a virtual image by the occupant (here, the driver) of vehicle 30 (moving body 300) and that includes content 7 related to object 6 (see FIG. 5). Specifically, based on the position of object 6 detected by object detection sensor 41 or navigation device 42 (to be described below) and the position and moving direction of vehicle 30 (moving body 300) detected last by vehicle information detection sensor 5 (to be described below), drawer 21 determines the display position of content 7 at predetermined display intervals (e.g., every 1/60 second). Drawer 21 draws display image 8 including content 7 so that content 7 is projected on windshield 32 (the display medium) at the display position determined. It is to be noted that the display position of content 7 is a position in a display coordinate space and is not a position in the real space.

Content 7, which is a displayed element including an indication such as a text string, a symbol, a geometrical figure, or an image, may be said to be a component of a certain image for one frame displayed on a liquid crystal display (LCD) of projector 22. Content 7 may include, for example, an image that highlights object 6 in display image 8. Specifically, if object 6 is a person ahead of vehicle 30, content 7 may be a mark highlighting the person. For example, the mark may include a circle surrounding the person's feet, or a rectangular frame surrounding the entire person. If object 6 is the road ahead of vehicle 30, content 7 may be an arrow indicating the direction in which vehicle 30 is expected to move along a route set by navigation device 42. The arrow may indicate straight ahead, right turn, or left turn, for example. Content 7 is not limited to a mark or an arrow but may be any item related to object 6. For example, content 7 may be a red line superimposed on a white line defining the lane in order to warn vehicle 30 likely to enter an adjoining lane. Projector 22 projects an image onto windshield 32 to allow the driver of vehicle 30 to view a virtual image (an image shown on HUD display surface I1). In other words, projector 22 projects display image 8 drawn by drawer 21 onto windshield 32 (the display medium) to be viewed as a virtual image by the occupant of vehicle 30 (moving body 300). Projector 22 includes an LCD, a plane mirror, and a concave mirror, for example. The image drawn by drawer 21 is displayed on the LCD. The image displayed on the LCD is reflected off the plane mirror and enlarged by the concave mirror, and then projected onto windshield 32.

Display correction system 100 includes a computer having memory and a processor (a microprocessor), for example. The processor executes a control program stored in the memory and controls components of display correction system 100 to implement various functions. The memory may be read only memory (ROM) having programs and data stored therein, or random access memory (RAM) used for storing data and other items in executing programs, and may include nonvolatile memory, for example. The control program defines, for example, display correction processing for correcting a displacement of content 7 in display image 8 displayed on the display medium.

Display correction system 100 has the following functions. According to the control program for display correction processing executed by the processor, display correction system 100 obtains pieces of information, for example from object detection sensor 41 and navigation device 42 and from vehicle information detection sensor 5. Based on the information obtained, display correction system 100 corrects the display position of content in the display image drawn by drawer 21.

Object detection sensor 41, which is a sensor for advanced driver-assistance systems (ADAS), is provided in the interior or exterior of vehicle 30. Object detection sensor 41 senses the view in front of the occupant (here, the driver) of vehicle 30 periodically (e.g., at predetermined time intervals, such as every 1/60 second). In the embodiment, object detection sensor 41 includes an image sensor (a camera) that may detect light in the view in front. The camera may be a stereo camera or a monocular camera. Object detection sensor 41 may also include a radar that detects reflection of electromagnetic waves, or a Light Detection and Ranging (LiDAR), for example. Object detection sensor 41 outputs information resulting from the sensing to display system 200 (display correction system 100).

For example, object detection sensor 41 recognizes object 6 in the vicinity of the vehicle (e.g., within 100 m ahead) in the view in front of vehicle 30 and outputs, as the result of the recognition, information such as the details and position of object 6. Object 6 is, for example, a moving body (e.g., another vehicle or a pedestrian), a road sign, a white line on the road, a sign on the road, a curb, a guardrail, a signal, a utility pole, or a building. Because object detection sensor 41 in the embodiment includes a camera, object detection sensor 41 recognizes object 6 by performing image processing, such as pattern matching, on an image of the view in front of the vehicle resulting from the sensing. In an example in which object detection sensor 41 is a radar, object detection sensor 41 may extract and recognize object 6 by performing techniques such as clustering or machine learning on information resulting from the sensing. As the position of object 6, object detection sensor 41 may determine a position relative to vehicle 30, or an absolute position based on positioning information obtained by a positioning system such as a global positioning system (GPS).

Navigation device 42, including a positioning system such as a GPS receiver, has a vehicle navigation function based on positioning information obtained by the positioning system and based on map data. To obtain data (e.g., map data) from an external entity through communication and to store the data, navigation device 42 may include a storage device, such as a memory device or a hard disk device, and a transceiver. Navigation device 42 may measure the current position of vehicle 30 with the positioning system, and compute the moving direction of the vehicle based on the current position and previously measured position of vehicle 30. Navigation device 42 also recognizes object 6 within 100 m ahead of vehicle 30 in the moving direction based on the map data, and outputs, as the result of the recognition, information such as the details and position of object 6 to display system 200 (display correction system 100). Object 6 may be an intersection, for example.

Vehicle information detection sensor 5 includes sensors for detecting the state of vehicle 30, and outputs information indicating the detected state to display system 200 (display correction system 100). The state of vehicle 30 may include, for example, the vehicle speed, the rotation speed (such as the rotation speed of the engine), the steering angle (the rotation angle of the steering wheel), the inclination (the pitch), the acceleration, and the yaw rate.

In the embodiment, vehicle information detection sensor 5 includes gyro sensor 51. Gyro sensor 51 detects the orientation (the pitch angle, the yaw angle, and the roll angle) of vehicle 30 by detecting the angular velocity of vehicle 30 (moving body 300).

Display correction system 100 includes first obtainer 11, second obtainer 12, third obtainer 13, predictor 14, and corrector 15. First obtainer 11 obtains travel route information on travel route A1 ahead of vehicle 30 (moving body 300). That is, first obtainer 11 obtains travel route information on travel route A1 that vehicle 30 has not reached yet. First obtainer 11 is the agent of first obtaining step ST1 in a display correction method. In an example in which travel route A1 is a road to be traveled by vehicle 30, the travel route information includes information indicating the shape of the road, such as a slope, a curve, or a bad road. In an example in which travel route A1 is a virtual travel route that will be a track of a watercraft or an aircraft, the travel route information includes information indicating the shape of the virtual travel route.

In the embodiment, first obtainer 11 obtains the result of detection by object detection sensor 41 to obtain the travel route information (here, information such as the shape of the road ahead of vehicle 30). First obtainer 11 also obtains the result of recognition by navigation device 42 to obtain the travel route information (here, information such as the shape (in particular, a curve) of the road ahead of vehicle 30). If the map data obtained by navigation device 42 includes data on the inclination of travel route A1 or data on whether travel route A1 is a bad road, first obtainer 11 may obtain, as the travel route information, information indicating a slope or a bad road.

Second obtainer 12 obtains speed information on the speed of vehicle 30 (moving body 300). Second obtainer 12 is the agent of second obtaining step ST2 in the display correction method. In the embodiment, second obtainer 12 obtains the current speed of vehicle 30 as the speed information, for example by obtaining vehicle speed signals (vehicle speed pulses) output by pulse generator 9 provided in vehicle 30. If vehicle information detection sensor 5 has an accelerometer, second obtainer 12 may obtain the speed information by obtaining the result of detection by the accelerometer and calculating the current speed of vehicle 30 from the acceleration obtained.

Third obtainer 13 obtains orientation information on the orientation of vehicle 30 (moving body 300). Third obtainer 13 is the agent of third obtaining step ST3 in the display correction method. In the embodiment, third obtainer 13 obtains the orientation information by obtaining the result of detection by vehicle information detection sensor 5. The orientation information includes information indicating the orientation of vehicle 30, such as the pitch angle, the yaw angle, and the roll angle.

Figure 4:
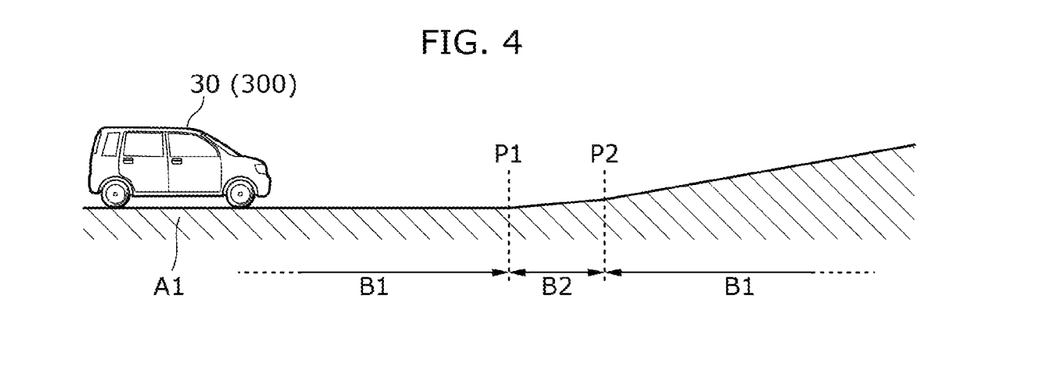
FIG. 4 is a diagram for describing operations of a predictor in the display correction system in the embodiment.

Predictor 14, based on the travel route information obtained by first obtainer 11 and the speed information obtained by second obtainer 12, predicts the time period during which vehicle 30 (moving body 300) travels specific section B2 in travel route A1. Predictor 14 is the agent of predicting step ST4 in the display correction method. FIG. 4 is a diagram for describing operations of predictor 14 in display correction system 100 in the embodiment. As illustrated in FIG. 4, specific section B2 is a section ahead of vehicle 30 and yet to be reached by vehicle 30 in travel route A1. Specific section B2 is also a section having characteristics different from those of normal sections B1, which are sections other than specific section B2 in travel route A1.

In the embodiment, normal sections B1 are sections in travel route A1 that are straight and do not or substantially do not change in inclination (in other words, the amount of change in gradient per unit distance is smaller than a predetermined value). In the embodiment, specific section B2 is a section in travel route A1 that is in transition from normal section B1 to a slope (an upward or downward slope), or from a slope to normal section B1, and changes in inclination (in other words, the amount of change in gradient per unit distance is greater than the predetermined value).

Based on the travel route information obtained by first obtainer 11, predictor 14 determines specific section B2. As a detailed example, for any point in travel route A1 ahead of vehicle 30 (moving body 300), predictor 14 calculates the distance from vehicle 30 and the height from a reference plane, based on a captured image of travel route A1 captured by the camera serving as object detection sensor 41. The reference plane here corresponds to, for example, the surface of normal section B1 in travel route A1.

As above, for each of sequential points along the moving direction of vehicle 30 (moving body 300), predictor 14 calculates the distance from vehicle 30 and the height from the reference plane. Predictor 14 identifies a point at which the amount of change in the height from the reference plane per unit distance becomes greater than or equal to a predetermined value, and determines the identified point to be start point P1 of specific section B2 (here, a section in which the inclination changes). Predictor 14 also identifies a point beyond start point P1 of specific section B2 and at which the amount of change in the height from the reference plane per unit distance becomes smaller than the predetermined value, and determines the identified point to be end point P2 of specific section B2. In this manner, predictor 14 predicts specific section B2 ahead of vehicle 30. In the embodiment, predictor 14 can predict specific section B2 when vehicle 30 reaches a point several tens of meters before specific section B2.

Then, based on the speed information obtained by second obtainer 12, predictor 14 predicts the time period during which vehicle 30 (moving body 300) travels specific section B2. As a detailed example, based on the distance from the current position of vehicle 30 to start point P1 of specific section B2 and the current speed of vehicle 30, predictor 14 calculates the time required by vehicle 30 to reach start point P1. Further, based on the distance from the current position of vehicle 30 to end point P2 of specific section B2 and the current speed of vehicle 30, predictor 14 calculates the time required by vehicle 30 to reach end point P2. In this manner, predictor 14 predicts the time period from when vehicle 30 reaches specific section B2 to when vehicle 30 passes through specific section B2, that is, the time period during which vehicle 30 travels specific section B2.

The above prediction processing by predictor 14 may be performed each time the camera serving as object detection sensor 41 captures the view in front, that is, for every frame, or may be performed for every several frames.

Corrector 15, based on the orientation information obtained by third obtainer 13, corrects a displacement of the display position of content 7 in display image 8 displayed by display system 200 on windshield 32 (the display medium). Corrector 15 is the agent of correcting step ST5 in the display correction method. The orientation of vehicle 30 may change due to causes such as an uneven road surface or acceleration or deceleration of vehicle 30 (moving body 300). Upon such a change in orientation, the real view seen by the occupant through windshield 32 (the display medium) changes. If the display position of content 7 in display image 8 projected on windshield 32 remains fixed in spite of the change in the orientation of vehicle 30, the display position of content 7 will be displaced with respect to the real view. To address this, corrector 15 corrects the displacement of the display position of content 7 in display image 8 according to the change in the orientation of vehicle 30. This allows drawer 21 to draw display image 8 such that content 7 is displayed at the correct display position with respect to the real view.

The processing of correcting a displacement of the display position of content 7 by corrector 15 will be described below with reference to FIG. 5. FIG. 5 is a diagram for describing operations of corrector 15 in display correction system 100 in the embodiment. In the example illustrated in FIG. 5, road cone 61 is placed as object 6 ahead of vehicle 30 (moving body 300). To call the occupant's attention to road cone 61, display image 8 including content 7, which is arrow 71 pointing to road cone 61, is projected on windshield 32 (the display medium).

In the example illustrated in FIG. 5, vehicle 30 runs onto bump A11 on travel route A1 to temporarily change its orientation. Specifically, vehicle 30 runs onto bump A11 to be inclined backward at an angle $\theta 1$ in the pitch direction. Consequently, the real view seen by the occupant through predetermined area D1 on windshield 32 (the display medium) (in other words, the real view seen by the occupant through display image 8) is shifted downward by an amount of change in position corresponding to the angle $\theta 1$ in the pitch direction (see a solid frame in FIG. 5). A dashed frame in FIG. 5 indicates the real view seen by the occupant through display image 8 before the temporary change in the orientation of vehicle 30. Without correction processing by corrector 15, arrow 71 would point to a position higher than road cone 61, resulting in a displacement of the display position of content 7 (arrow 71) (see a dashed arrow in FIG. 5).

Corrector 15 therefore refers to the orientation information obtained by third obtainer 13 (here, the amount of change in the pitch angle of vehicle 30 (moving body 300)) to shift the display position of content 7 (arrow 71) in display image 8 downward by the amount of change in position corresponding to the angle $\theta 1$ in the pitch direction. Arrow 71 now correctly points to road cone 61, and the displacement of the display position of content 7 (arrow 71) is thus corrected (see solid arrow 71).

Further, in the embodiment, based on the prediction by predictor 14 of a section to be traveled by vehicle 30 (moving body 300), corrector 15 switches operation according to the predicted section.

Figure 6:
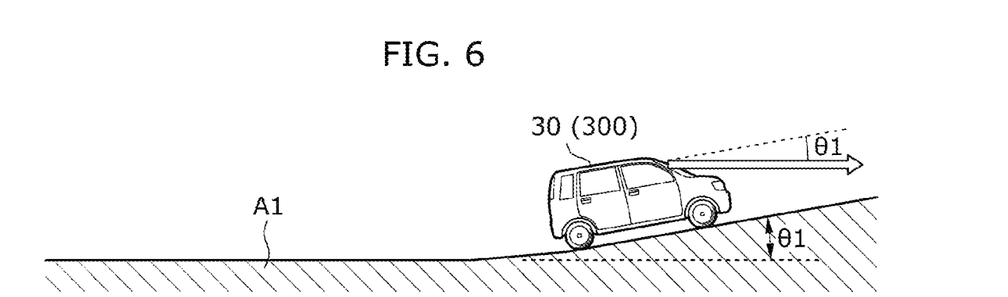
FIG. 6 is a diagram for describing a problem with operations of a display correction system in a comparative example.

Here, the background to switching the operation of corrector 15 according to the section traveled by vehicle 30 (moving body 300) will be described with reference to FIG. 6. FIG. 6 is a diagram for describing a problem with operations of a display correction system in a comparative example. The display correction system in the comparative example is different from display correction system 100 in the embodiment in that, in correcting a displacement of the display position of content 7 in display image 8, a corrector relies only on the orientation of vehicle 30 and not on the section traveled by vehicle 30 (moving body 300).

The corrector in the comparative example corrects a displacement of the display position of content 7 in display image 8 according to a change in the orientation of vehicle 30 (moving body 300). This poses the following problem. As illustrated in FIG. 6, while traveling a slope of an angle $\theta 1$, vehicle 30 is inclined backward at the angle $\theta 1$ in the pitch direction with respect to the horizontal plane. The corrector in the comparative example then shifts the display position of content 7 in display image 8 downward by an amount of change in position corresponding to the angle $\theta 1$ in the pitch direction (see a solid arrow in FIG. 6).

However, because vehicle 30 (moving body 300) traveling the slope moves in parallel with the sloped surface, the position of vehicle 30 in the pitch direction does not change with respect to the sloped surface. This means that the correction processing by the corrector is actually unnecessary. Thus, the correction by the display correction system in the comparative example contrarily creates a displacement of the display position of content 7, because the system relies only on the orientation of vehicle 30 in correcting the displacement of the display position of content 7 in display image 8, as mentioned above.

To solve the above problem, it may be possible to refer to the result of detection by gyro sensor 51 to determine whether a change in the orientation of vehicle 30 (moving body 300) is due to a change in the inclination of travel route A1. In this scheme, if the corrector determines that the change in the orientation of vehicle 30 is due to a change in the inclination, the corrector resets the correction of a displacement of the display position of content 7. This may solve the above problem.

However, in the above scheme, the correction processing is reset only after the detection of the change in the orientation of vehicle 30 (moving body 300) and the determination that the change is due to a change in the inclination. Consequently, the correction processing is continued for some time after vehicle 30 enters the slope. This creates a misalignment between the display positions of content 7 in display image 8 before and after resetting the correction processing, and the misalignment may feel unnatural to the occupant.

In addition, in the above scheme, referring to only the result of detection by gyro sensor 51 may not allow completely distinguishing between an uneven road surface and a slope. For example, the above scheme may fail to identify a gentle slope with a relatively small inclination as a slope. In another example, the above scheme may erroneously identify a road with a certain degree of surface unevenness as a slope.

Thus, the above scheme may still fail to accurately correct a displacement of the display position of content 7 in display image 8. In view of this, the inventor of the present invention has found out that proactively predicting specific section B2 and normal sections B1 by predictor 14 improves the accuracy of correcting a displacement of the display position of content 7 in display image 8 by corrector 15.

In the embodiment, corrector 15 performs first control if vehicle 30 (moving body 300) is determined to be travelling normal section B1, which is different from specific section B2, based on the result of prediction by predictor 14. Corrector 15 performs second control different from the first control if vehicle 30 is determined to be travelling specific section B2 based on the result of prediction by predictor 14. Specifically, corrector 15 switches control from the first control to the second control when vehicle 30 reaches start point P1 of specific section B2, and switches control from the second control to the first control when vehicle 30 passes through end point P2 of specific section B2.

In the first control, corrector 15 performs the correction processing described above. That is, corrector 15 refers to the orientation information obtained by third obtainer 13 (here, the amounts of change in the pitch angle of vehicle 30 (moving body 300)) to correct displacements of the display position of content 7 in display image 8. Thus, when vehicle 30 is travelling normal section B1, corrector 15 corrects displacements of the display position of content 7 in display image 8 according to temporary changes in the orientation of vehicle 30 due to an uneven road surface.

In the second control, corrector 15 performs control different from the first control. Specifically, the second control is less sensitive to changes in the orientation information than the first control is. In the embodiment, corrector 15 includes a high-pass filter that attenuates, out of vibrations of vehicle 30 (moving body 300) detected by gyro sensor 51, vibrations having frequencies lower than a predetermined frequency (a cutoff frequency). Therefore, in both the first control and the second control, corrector 15 performs the correction processing for correcting a displacement of the display position if the frequency of vibrations of vehicle 30 is higher than the predetermined frequency, and does not if the frequency is not higher than the predetermined frequency.

The second control has the predetermined frequency (the cutoff frequency) set higher than in the first control, and is therefore less sensitive to vibrations (i.e., changes in the orientation information) of vehicle 30 (moving body 300). The period of vibrations of vehicle 30 is relatively short (i.e., the frequency of vibrations is high) when vehicle 30 changes its orientation due to a cause such as an uneven road surface or acceleration or deceleration of vehicle 30. By contrast, the period of vibrations of vehicle 30 is relatively long (i.e., the frequency of vibrations is low) when vehicle 30 changes its orientation by ascending or descending a slope.

As such, the second control increases the predetermined frequency when vehicle 30 is travelling specific section B2, thereby not reacting to a change in the orientation of vehicle 30 ascending or descending a slope. Consequently, when vehicle 30 is travelling specific section B2, corrector 15 basically does not perform the correction processing for correcting a displacement of the display position of content 7 in display image 8. It is to be understood that, when vehicle 30 is travelling specific section B2, corrector 15 can still perform the correction processing to correct a displacement of the display position of content 7 in response to a change in the orientation of vehicle 30 that involves a vibration frequency higher than the predetermined frequency, for example due to an uneven road surface.

The higher the predetermined frequency (the cutoff frequency), the more frequency components in vibrations of vehicle 30 (moving body 300) attenuated, and accordingly, the less sensitive the control to changes in the orientation information on vehicle 30. Corrector 15 therefore increases the degree of correcting displacements of the display position of content 7 as the predetermined frequency is increased. This allows corrector 15 to accurately correct displacements of the display position of content 7 even for vibrations of vehicle 30 in which frequency components not higher than the predetermined frequency are attenuated.

The predetermined frequency (the cutoff frequency) of the high-pass filter can be switched by, for example, providing a high-pass filter for the first control and a high-pass filter for the second control and selectively using one of the two high-pass filters.

Operations

Figure 7:
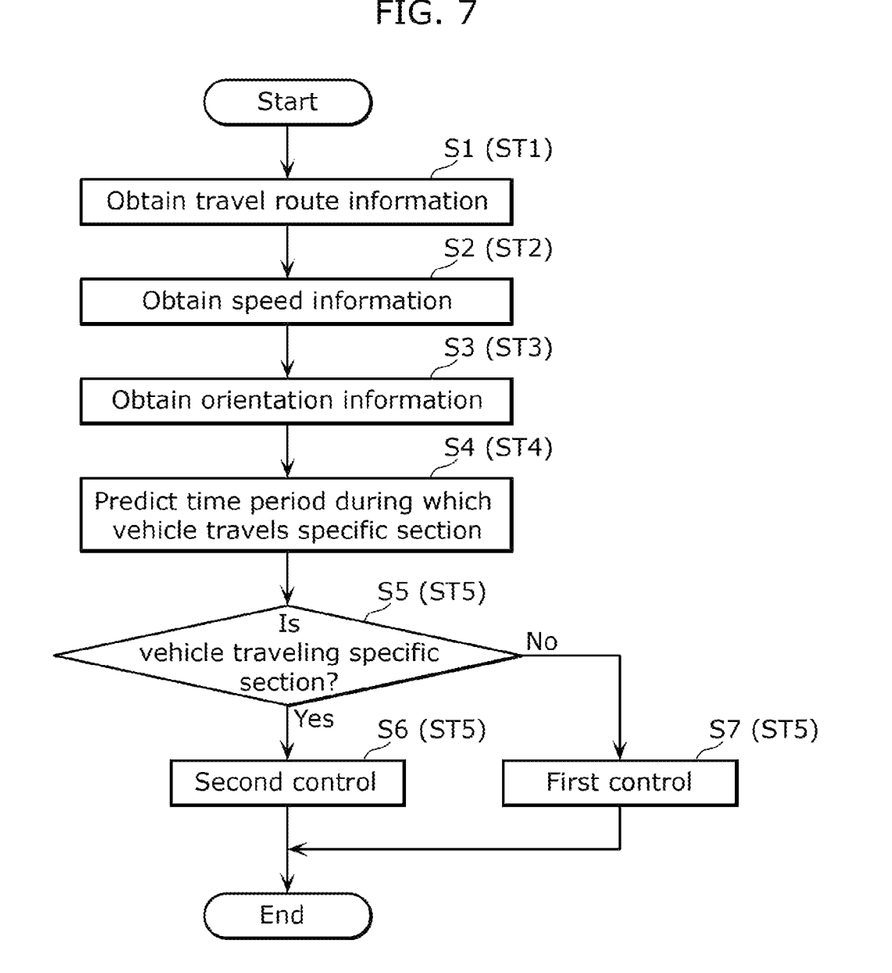
FIG. 7 is a flowchart illustrating exemplary operations of the display correction system in the embodiment.

Exemplary operations of display correction system 100 will be described below with reference to FIG. 7. FIG. 7 is a flowchart illustrating exemplary operations of display correction system 100 in the embodiment. First, first obtainer 11 periodically obtains the travel route information from object detection sensor 41 and navigation device 42 (S1). The processing at S1 corresponds to first obtaining step ST1 in the display correction method. Second obtainer 12 periodically obtains the speed information from pulse generator 9 (S2). The processing at S2 corresponds to second obtaining step ST2 in the display correction method. Third obtainer 13 periodically obtains the orientation information from vehicle information detection sensor 5 (S3). The processing at S3 corresponds to third obtaining step ST3 in the display correction method. It is to be noted that the processing at S1 to S3 are not sequentially performed in this order but are performed in parallel.

Based on the travel route information obtained by first obtainer 11 and the speed information obtained by second obtainer 12, predictor 14 predicts the time period during which vehicle 30 (moving body 300) travels specific section B2 in travel route A1 (S4). The processing at S4 corresponds to predicting step ST4 in the display correction method. Specifically, based on the travel route information, predictor 14 predicts whether specific section B2 is ahead of vehicle 30. If specific section B2 is ahead, predictor 14 predicts, based on the speed information, the time period during which vehicle 30 travels specific section B2. The description here assumes that predictor 14 predicts that specific section B2 is ahead of vehicle 30.

Based on the result of the prediction by predictor 14, corrector 15 switches between the first control and the second control. Specifically, if vehicle 30 (moving body 300) is travelling specific section B2 (Yes at S5), corrector 15 performs the second control (S6). If vehicle 30 is not travelling specific section B2, or in other words, is travelling normal section B1 (No at S5), corrector 15 performs the first control (S7). That is, corrector 15 performs the second control during the time period between reaching start point P1 of specific section B2 and passing through end point P2, and performs the first control during other time periods. The processing at S5 to S7 corresponds to correcting step ST5 in the display correction method. The above sequential processing is repeated thereafter.

Advantages

As described above, in display correction system 100 in the embodiment, corrector 15 performs the first control if vehicle 30 (moving body 300) is determined to be travelling normal section B1 based on the result of prediction by predictor 14, and performs the second control if vehicle 30 is determined to be travelling specific section B2 (here, a section in which the inclination changes) based on the result of prediction by predictor 14. Thus, in the embodiment, corrector 15 performs control in specific section B2 that is different from control in normal sections B1, for example reducing the possibility of performing the correction processing in specific section B2. This can advantageously improve the accuracy of correcting a displacement of the display position of content 7 in display image 8.

In the embodiment, because predictor 14 can proactively predict specific section B2 ahead of vehicle 30 (moving body 300), the second control can be started upon the arrival of vehicle 30 at specific section B2. The embodiment thus advantageously prevents an unnatural feeling for the occupant, compared with the scheme that involves referring to the result of detection by gyro sensor 51 to determine whether a change in the orientation of vehicle 30 is due to a change in the inclination of travel route A1.

Further, in the embodiment, predictor 14 can more successfully predict, as specific section B2, a slope with a relatively gentle inclination that cannot be completely identified as specific section B2 by referring to only the result of detection by gyro sensor 51. Also, in the embodiment, predictor 14 can more successfully predict, as normal section B1, a section with an uneven road surface that can be erroneously identified as a slope by referring to only the result of detection by gyro sensor 51.

Variations

While the display correction system according to the present disclosure has been described with reference to the above embodiment, the present disclosure is not limited to the above embodiment. Without departing from the spirit of the present disclosure, variations in which modifications occurring to those skilled in the art are made to the above embodiment may be within in the scope of the present disclosure.

Although predictor 14 in the above embodiment predicts a section in which the inclination changes in travel route A1 as specific section B2, this is not limitative. For example, predictor 14 may predict a curved section in travel route A1 as specific section B2. This scheme can solve the following problem. Vehicle 30 (moving body 300) produces vibrations in the yaw direction when travelling a curved section. The vibrations in the yaw direction may affect the pitch direction, in which case the correction processing can be erroneously performed in the curve, although the correction processing is expected to be performed for vibrations in the pitch direction on a road with an uneven surface.

In view of the above possibility, it may be possible that corrector 15 increases the predetermined frequency (the cutoff frequency) of the high-pass filter to prevent such erroneous correction processing in a curved section. However, increasing the predetermined frequency of the high-pass filter may lead to inability to detect vibrations of relatively low frequencies of vehicle 30 (moving body 300).

To solve the above problem, predictor 14 may predict a curved section in travel route A1 as specific section B2. Corrector 15 can then take a measure of increasing the predetermined frequency (the cutoff frequency) of the high-pass filter only in specific section B2 and not in normal sections B1. This scheme advantageously facilitates detecting vibrations of relatively low frequencies of vehicle 30 (moving body 300).

In another example, predictor 14 may predict, as specific section B2, a bad-road section with a relatively highly uneven road surface (e.g., a stone-paved section) in travel route A1. For example, predictor 14 can predict whether a bad road is ahead by performing template matching on a captured image of travel route A1 captured by the camera serving as object detection sensor 41. This scheme can solve the following problem. When vehicle 30 (moving body 300) is travelling a bad-road section, vibrations of vehicle 30 may include components of relatively high frequencies (e.g., several hertz). If these frequency components are detected and corrector 15 performs the correction processing, delays in performing the correction processing may create noticeable displacements of the display position of content 7 in display image 8, which may feel unnatural to the user.

To solve the above problem, predictor 14 may predict a bad-road section in travel route A1 as specific section B2. Corrector 15 can then add a low-pass filter only in specific section B2 to attenuate the above relatively high frequency components. This scheme can thus reduce the possibility that the above relatively high frequency components are detected and corrector 15 performs the correction processing. This can advantageously reduce the possibility that delays in performing the correction processing create noticeable displacements of the display position of content 7 in display image 8, thereby preventing an unnatural feeling for the user.

In the above embodiment, corrector 15 makes the second control less sensitive to vibrations (i.e., changes in the orientation information) of vehicle 30 (moving body 300) by setting the predetermined frequency (the cutoff frequency) of the high-pass filter higher than in the first control. However, this is not limitative. For example, in the second control, corrector 15 may entirely stop the correction processing. In other words, the second control may involve not performing the processing of correcting a displacement of the display position of content 7 in display image 8.

Although predictor 14 in the above embodiment predicts specific section B2 based on a captured image of travel route A1 captured by the camera serving as object detection sensor 41, this is not limitative. For example, predictor 14 may predict specific section B2 based on a positioning result or map data obtained by navigation device 42.

The configuration of projector 22 or the display scheme in the embodiment are not limited to those described above but may be modified according to any existing HUD technique. For example, projector 22 may be a laser projector or a liquid crystal on silicon (LCOS) projector instead of the LCD projector, or may use lenses instead of the mirrors. Projector 22 may include any number of mirrors. Further, the concave mirror in projector 22 may be motor-driven so that its angle is adjusted to the height of driver's viewpoint E1.

Although projector 22 in the above embodiment projects images onto windshield 32, projector 22 may project images onto a combiner, which is a semitransparent mirror provided separate from windshield 32. Projector 22 may also be configured to display images on a transmissive display provided in or on windshield 32.

The order of performing the steps of the above display correction processing in display correction system 100 is not necessarily limited to the order described above. Rather, the steps may be reordered or some steps may be eliminated without departing from the spirit of the present invention. All or some of the steps of the above display correction processing may be implemented in either hardware or software. Software-based processing is implemented in such a manner that a processor in an apparatus such as a computer executes a control program for the display correction processing stored in memory. The control program may be recorded on a recording medium to be distributed or transported. For example, the control program distributed can be installed in an apparatus having a processor and executed by the processor to cause the apparatus to perform all or part of the display correction processing.

The computer in above display correction system 100 may, although not necessarily, include an input device such as a touch pad, an output device such as a display or a speaker, a storage device such as a hard disk device or a solid state drive (SSD), a reading device for reading information from recording media such as digital versatile disc read only memory (DVD-ROM) discs or universal serial bus (USB) memory devices, and a transceiver for communication over a network. For example, if the above control program is recorded on a recording medium such as a USB memory device, the reading device reads the control program from the USB memory device and stores the control program in memory or other storage. Alternatively, the transceiver may communicate over a network with an external server device storing the control program and download the control program from the server device, and may store the control program in memory or other storage. Display correction system 100 may also be configured as an integrated circuit.

Implementations achieved by any combination of the above components and functions are within the scope of the present disclosure.

INDUSTRIAL APPLICABILITY

The present disclosure is applicable to systems such as display correction systems for correcting a displacement of the display position of content in a display image displayed by a display system on a display medium.

The invention claimed is:

1. A display correction system comprising:
   a first obtainer that obtains travel route information on a travel route ahead of a moving body;
   a second obtainer that obtains speed information on a speed of the moving body;
   a third obtainer that obtains orientation information on an orientation of the moving body;
   a predictor that performs, based on the travel route information and the speed information, processing of determining a specific section in the travel route and predicting a time period during which the moving body travels through the specific section; and
   a corrector that performs correction of a displacement of a display position of a content on a display image based on the orientation information, the display image being displayed on a display medium by a display system, wherein
   the corrector performs the correction under first control, when determining, based on a result of the processing performed by the predictor, that the moving body is traveling in a normal section other than the specific section in the travel route, and
   the corrector performs the correction under second control different from the first control, when determining, based on a result of the processing performed by the predictor, that the moving body is traveling in the specific section.

2. The display correction system according to claim 1, wherein
   the second control is less sensitive to a change in the orientation information than the first control is.

3. The display correction system according to claim 1, wherein
   the corrector performs the correction when a frequency of vibration of the moving body is higher than a predetermined frequency, and
   the predetermined frequency is set higher in the second control than in the first control.

4. The display correction system according to claim 1, wherein
   the corrector stops the correction under the second control.

5. The display correction system according to claim 1, wherein
   the specific section is a section in which an inclination of the travel route changes.

6. A display system comprising:
   the display correction system according to claim 1;
   a drawer that draws the display image; and
   a projector that projects the display image onto the display medium to be viewed as a virtual image by an occupant of the moving body, the display image being drawn by the drawer.

7. A display correction method comprising:
   obtaining travel route information on a travel route ahead of a moving body;
   obtaining speed information on a speed of the moving body;
   obtaining orientation information on an orientation of the moving body;
   performing, based on the travel route information and the speed information, processing of (i) determining a specific section in the travel route and (ii) predicting a time period during which the moving body travels through the specific section; and
   correcting a displacement of a display position of a content on a display image based on the orientation information, the display image being displayed on a display medium by a display system, wherein the correcting is performed under first control, when determining, based on a result of the processing performed in the performing, that the moving body is traveling in a normal section other than the specific section in the travel route, and the correcting is performed under second control different from the first control, when determining, based on a result of the processing performed in the performing, the moving body is traveling in the specific section.

* * * * *